United States Patent [19]

Nishida et al.

[11] Patent Number: 4,806,952
[45] Date of Patent: Feb. 21, 1989

[54] INFORMATION RECORDING APPARATUS FOR RECORDING/REPRODUCING INFORMATION BY IRRADIATING AN INFORMATION RECORDING MEDIUM WITH AN ENERGY BEAM

[75] Inventors: Tetsuya Nishida, Koganei; Motoyasu Terao, Tokyo; Yasushi Miyauchi, Hachioji; Shinkichi Horigome, Tachikawa; Kazuo Shigematsu, Saitama; Norio Ohta, Sayama; Toshimitsu Kaku, Sagamihara; Masahiro Ojima, Tokyo, all of Japan

[73] Assignee: Hitachi, Ltd., Tokyo, Japan

[21] Appl. No.: 69,177

[22] Filed: Jul. 2, 1987

[30] Foreign Application Priority Data

Jul. 4, 1986 [JP] Japan .................. 61-156101

[51] Int. Cl.⁴ .............................................. G01D 9/42
[52] U.S. Cl. .................. 346/108; 346/135.1; 346/76 L

[58] Field of Search .................. 346/108, 107 R, 76 L, 346/135.1

[56] References Cited

U.S. PATENT DOCUMENTS 4,434,429 2/1984 Terao ........................ 346/135.1

*Primary Examiner*—H. Broome
*Assistant Examiner*—Mark Reinhart
*Attorney, Agent, or Firm*—Antonelli, Terry & Wands

[57] ABSTRACT

In an information recording apparatus according to this invention, since it is not necessary to dispose any differential circuit, which was required heretofore, it is possible to fabricate it with a low cost and its error rate is also very small.

Furthermore, since the mean reflectivity on the recording track does almost not vary by the fact that information is recorded there, no tracking off-set or focusing off-set is produced. Thus effects of this invention are remarkable.

7 Claims, 7 Drawing Sheets (a)

(b)

(c)

→ TIME

F I G. 5A
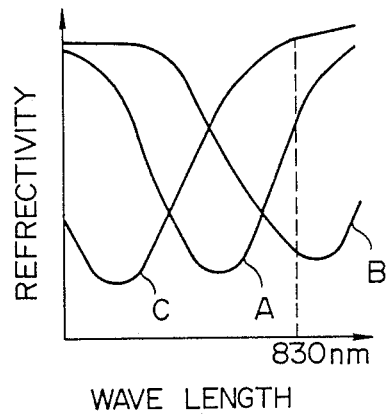
F I G. 5B
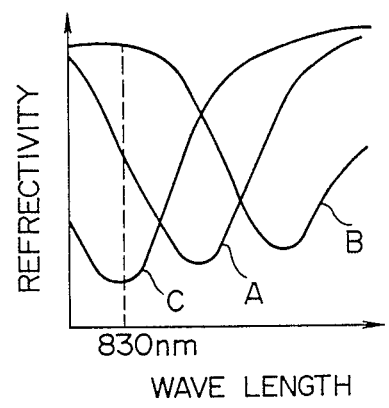
F I G. 5C
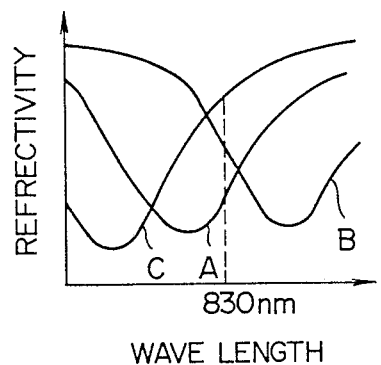

F I G. 8
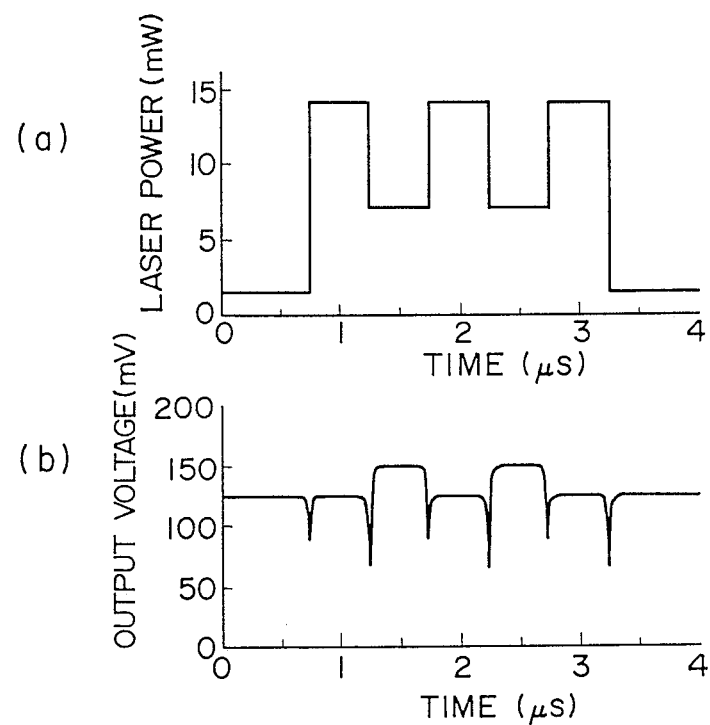

(a)

(b)

(a)

(b)

INFORMATION RECORDING APPARATUS FOR RECORDING/REPRODUCING INFORMATION BY IRRADIATING AN INFORMATION RECORDING MEDIUM WITH AN ENERGY BEAM

BACKGROUND OF THE INVENTION

This invention relates to an information recording apparatus for recording information by irradiating an information recording medium with an energy beam.

As apparatuses for recording digital signals such as signals obtained by frequency-modulating analogue signals of image, sound, etc., data of electronic computers, facsimile signals, digital audio signals, etc. in real time, there are used apparatuses for recording information by irradiating an information recording medium with an energy beam such as a laser beam, electron beam, etc.

Heretofore, as apparatuses for recording information by irradiating the information recording medium with a laser light beam, there are known apparatuses, in which various changes such as deformation, phase change, chemical change, change in the magnetic field, etc. are produced in the information recording medium, depending on the waveform of the laser light pulse. Among them those using deformation are disclosed e.g. in U.S. Pat. No. 4,238,803 and those using phase change are described in U.S. Pat. No. 3,530,441.

However, in such prior art information recording apparatuses, in the case where pulses of an energy beam, as indicated in FIG. 1(a), are projected thereon, the waveform of reproduced signals is deformed as indicated in FIG. 1(b) and it is not possible to specify the recorded position with a high precision. For this reason the reproduced signal is differentiated so as to transform it into a signal as indicated in FIG. 1(c) and the recorded position is defined as the position, where the signal level is 0. Therefore the prior art information recording apparatus required a differential circuit, which gave rise to problems that the signal to noise ratio decreased and that the apparatus was too expensive. Further there was another problem that tracking off-set or focusing off-set was easily produced, because the mean reflectivity on the recording track was varied by the fact that information was recorded there.

SUMMARY OF THE INVENTION

The object of this invention is to provide an information recording medium, which is inexpensive and nevertheless whose error rate is small, in order to resolve the problems mentioned above.

This object is achieved in an apparatus according to this invention, in which information is recorded by irradiating an information recording medium with an energy beam, by selecting a combination of the time ($\tau$) necessary for the phase change in the recording medium, the amount of thermal diffusion (a) of the recording medium including a recording film and a protective layer, the radius (r) of the projected energy beam, the linear velocity (v) of the recording medium, and cooling time ($\alpha$) after having turned-off the pulse of the energy beam, so that after the reproduced signal obtained from a portion, where the variation rate of the energy given to the information recording medium with respect to time is large, moves in one direction, it moves in the opposite direction. That is, for a power-modulated pattern of the energy beam indicated in FIG. 2(a), reconstructed signals as indicated in FIG. 2(c)-(h) or their up and down inverted signals are obtained, while heretofore it was reconstructed signals as indicated in FIG. 2(b) that were obtained.

A more concrete example of the method is as follows. For example, in a recording medium, in which recording and erasing are effected by reversible phase change between crystal and amorphous by means of irradiation with an energy beam such as a laser light beam (light recording medium by phase change), the object of this invention is achieved by determining the time, which is necessary for the phase change from amorphous to crystal during the irradiation with a laser light beam, i.e. the crystallization time ($\tau$) so that $$\alpha < \tau < \beta, a = A\frac{arl}{v}, \beta = B\frac{arl}{v} \quad (1)$$

is satisfied, where $\alpha$: time during which the temperature of a portion of the recording medium where the falling part of the energy beam pulse is irradiated passes through a phase-change temperature area, $\beta$: time during which the temperature of a portion of the recording medium where the continuous part of the energy beam pulse is irradiated passes through the phase-change temperature area, a: amount of thermal diffusion of the recording medium including a recording film (3) and a protective layer (4), A: constant, B: constant, A<B r: radius of the projected energy beam, v: linear velocity of the recording medium, and l: pulse width of the beam pulse.

Moreover the amount of thermal diffusion a is represented by the following formula:

$$a = \text{(thermal conductivity) (specific heat)}^{-1} \text{(density)}^{-1} \text{(film thickness)} \quad (2)$$

For example, in the case where the composition of the recording film is $Ge_{43}Te_{47}Se_{10}$ and the protective layer is made of $SiO_2$, when $\tau=40$ ns, $a=0.5$ ($\mu$m)$^3/\mu$s, $r=0.8$ $\mu$m and $\alpha=20$ ns, the condition represented by Eq. (1) is satisfied and thus the recording method according to this invention can be realized, if $v<10$ m/s.

In the case where the composition of the recording film is $Ge_{43}Te_{47}Tl_{10}$ and the protective layer is made of $SiO_2$ on the light incidence side and Al on the side opposite thereto, when $\tau=10$ ns, $a=0.15$ ($\mu$m)$^3/\mu$s, $r=0.8$ $\mu$m and $\alpha=4$ ns, the condition represented by Eq. (1) is satisfied and thus the recording method according to this invention can be realized, if $v<12$ m/s.

Further, when the diameter of the recording medium is 13 cm and the number of rotation per unit time is 1200 rpm, the linear velocity of the outermost periphery of the recording medium is 8 m/s. In this case, when the composition of the recording film is $Ge_{38}Te_{42}Se_{20}$; the protective layer is made of $ZrO_2$; $\tau=100$ ns; $a=1.0$ ($\mu$m)$^3/\mu$s; and $\alpha=50$ ns, the condition represented by Eq. (1) is satisfied and thus the recording method according to this invention can be realized.

In this information recording apparatus, in the case where the reproduced signal is emitted only from a position, where the variation rate of the energy given to the information recording medium with respect to time is large, and where a light recording medium by phase change, whose composition is $Ge_{43}Te_{47}Se_{10}$, is irradiated with a rectangular light pulse at a linear velocity of 8 m/s, in the rising and falling portions of the pulse, since the cooling time is shorter than the time necessary for the crystallization, the recording medium is made amorphous and in the continuous light irradiation portion of the pulse, since the cooling time is longer than the time necessary for the crystallization, the recording medium is recrystallized. Therefore, peaks of the reconstructed signal appear only at the rising and falling portions of the pulse.

According to this invention, increase in the error rate due to jitter of the detected signal is small with respect to that obtained according to the prior art method, i.e. method, by which a signal, whose shape is similar to that of the given light pulse, is obtained and its rising and falling portions are detected (so-called pit-edge detection method).

In addition, according to this invention, since the recording medium is made amorphous only at the rising and falling portions of the pulse and spike-shaped reconstructed signals are obtained only there, the mean reflectivity on the recording track hardly varies compared with the prior art method, which gives rise to no tracking off-set or off-set of the autofocus.

BRIEF DESCRIPTION OF THE DRAWINGS

FIGS. 4A to 4C and 5A to 5C are schemes for explaining the working principle of the information recording apparatus according to this invention;

FIGS. 8a and 8b show waveforms indicating the relation between the light pulse for recording and a reproduced signal in a modification of Embodiment 1 of this invention;

DESCRIPTION OF THE PREFERRED EMBODIMENTS

This invention will be explained more in detail, using Embodiments 1 and 2.

Embodiment 1

Figure 1:
FIGS. 1a, 1b, and 1c show waveforms indicating the relation among the light pulse for recording, the reproduced signal, and the differentiated signal in a prior art information recording apparatus.
Figure 1:
Figure 1:
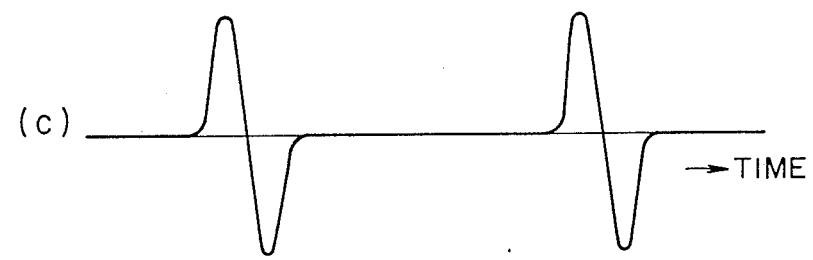
Figure 2:
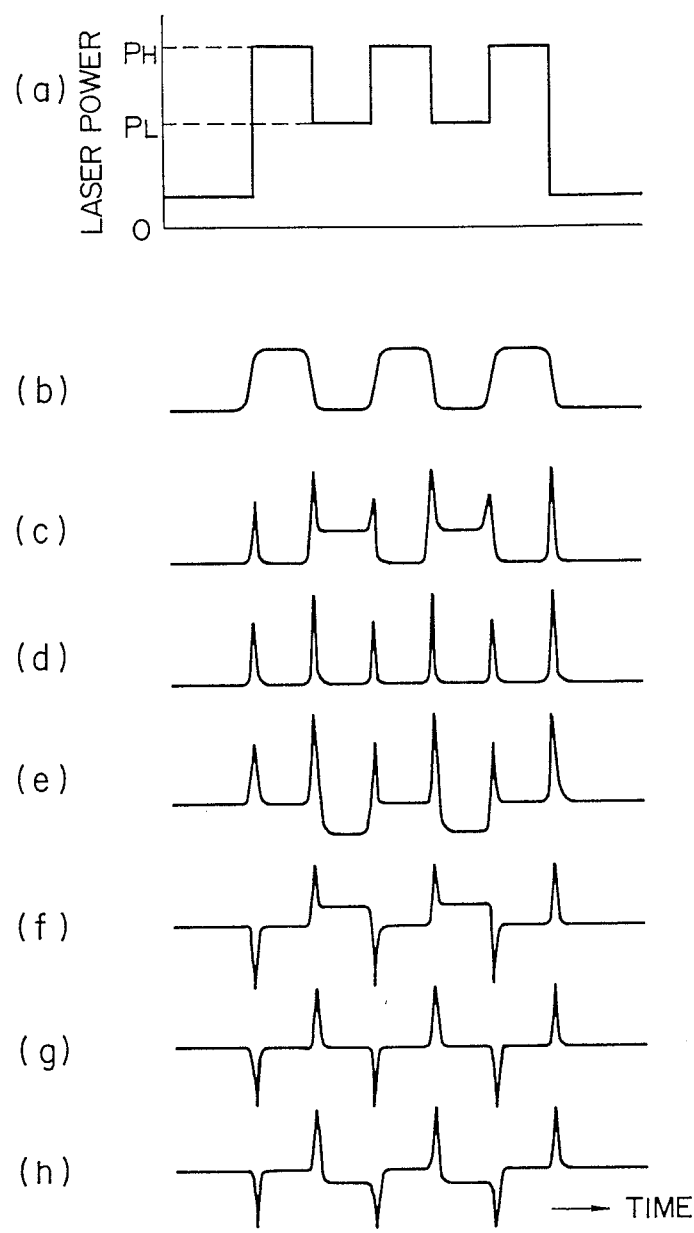
FIGS. 2a, 2b, 2c, 2d, 2e, 2f, 2g and 2h show waveforms indicating the relation between the light pulse for recording and reproduced signals in the information recording apparatus.
Figure 3:
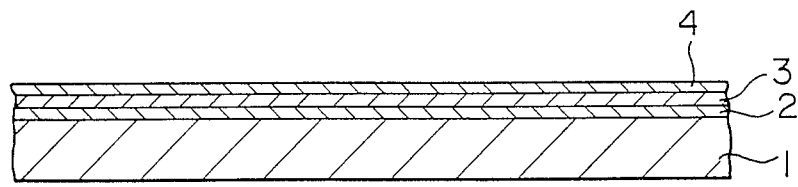
FIG. 3 is a cross-sectional view of an information recording medium used in an information recording apparatus.

FIG. 3 is a cross-sectional view of a part of information recording medium used in an information recording apparatus according to this invention. In the figure, reference numeral 1 is a base plate consisting of a disk made of chemically reinforced glass replicated with a groove for tracking, 1.1 mm thick, whose diameter is 130 mm, which is made of an ultra-violet ray hardening resin disposed on the surface of the disk. 2 is a protective layer made of SiO$_2$ formed on the base plate 1 by the magnetron-sputtering method, the protective layer being 110 nm thick. 3 is a thin recording film formed on the protective layer 2, the recording film being formed by the evaporation method by vaporizing Ge, Te and Se independently. 4 is a protective layer made of SiO$_2$ formed on the recording film 3 by the magnetron-sputtering method, this protective layer 4 being 110 nm thick.

Figure 4A:
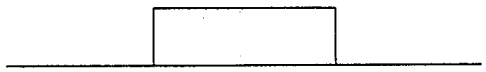
Figure 4B:
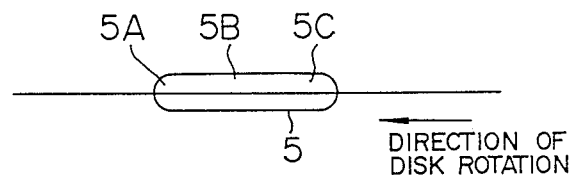
Figure 4C:
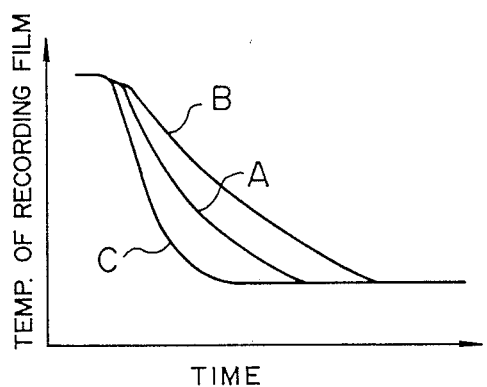

When such an information recording medium is continuously irradiated with a laser diode light beam of 14.1 mW, the irradiated portion of the recording film 3 is melted so that the elements in the recording film 3 react sufficiently on each other and that it can be locally crystallized during cooling after the irradiation. Now, when this information recording medium is irradiated with a rectangular laser light pulse for recording as indicated in FIG. 4A, a recorded portion 5 indicated in FIG. 4B is formed in the recording film 3. In this case, when the recording film 3 at the part 5A in the recorded portion 5 corresponding to the rising edge of the light pulse cools down, since the part adjacent on the left side to the irradiated portion 5 in FIG. 4B is not irradiated with the laser light, it cools down relatively rapidly, as indicated by a curve A in FIG. 4C, after the laser light has passed therethrough. Further, when the recording film 3 at the part 5B corresponding to the middle part of the light pulse cools down, since there exists the laser light at the part 5B adjacent on the right side thereto and the temperature of the recording film 3 at the part adjacent on the left side thereto is high, it cools very slowly, as indicated by a curve B in FIG. 4C, after the laser light has passed therethrough. Still further, when the recording film 3 at the part 5C in the recorded portion 5 corresponding to the falling edge of the light pulse, since there exist no light beam at the part adjacent on the right side thereto, it cools down very rapidly, as indicated by a curve C in FIG. 4C. In this way, at the parts 5A and 5C, since the recording film 3 cools down rapidly after the temperature thereof exceeds its melting point at least at a part of the irradiated portion, it becomes amorphous. However, since the cooling speed of the recording film 3 at the part 5C is greater than that at the part 5A, the proportion of the part of the recording film 3 which is amorphous is greater at the part 5C than at the part 5A. On the other hand, at the part 5B, since the recording film 3 cools down slowly after the temperature thereof has exceeded its melting point, the recording film 3 is recrystallized and it becomes crystal. If the power of the laser light is set so that the highest temperature, which the recording film reaches during the irradiation, is slightly over its melting point, the temperature at the part 5A is slightly under its melting point and thus at this part the recording film is crystallized without melting. Consequently the crystallized state at the part 5A is somewhat different from that at the part 5B. This difference of these states can be detected also optically. Since the recording film 3 is thin, when the recording film 3 is irradiated with reading (or reproducing) light, it is reflected at the front and back side surfaces of the recording film 3. Since these reflected light beams interfere with each other, there is a minimum in the variation of the reflectivity with respect to the wavelength of the reading light, as indicated in FIGS. 5A, 5B and 5C. In addition, since the reflectivity of the recording film 3 is smaller in the amorphous state than in the crystallized state, the wavelength of the reading light, for which the reflectivity is minimum, is shorter when the recording film 3 is amorphous than when it is crystallized. As indicated in FIGS. 5A, 5B and 5C, the relation between the wavelength of the reproduction light and the reflectivity of the information recording medium at the parts 5A, 5B and 5C can be represented by curves A, B and C, respectively. Furthermore, the wavelength of the reading light, for which the reflectivity is minimum, becomes longer with increasing thickness of the recording film 3. For this reason, it is possible to vary the wavelength of the reading light, for which the reflectivity is minimum, at the parts 5A, 5B and 5C of the information recording medium, as indicated in FIGS. 5A, 5B and 5C, by varying the thickness of the recording film 3. The thickness of the recording film is in a order that FIG. 5B>FIG. 5C>FIG. 5A. In the case where the information recording medium is irradiated with a rectangular laser light pulse for recording indicated in FIG. 6(a) and reproduction is effected with reading light whose wavelength is 830 nm, when the relation between the wavelength of the reading light and the reflectivity is as indicated in FIG. 5A, a reproduced signal indicated in FIG. 6(b) can be obtained. When the relation between the wavelength of the reading light and the reflectivity is as indicated in FIG. 5(b), a reproduced signal indicated in FIG. 6(c) can be obtained and further when the relation between the wavelength of the reading light and the reflectivity is as indicated in FIG. 5(c) a reproduced signal indicated in FIG. 6(d) can be obtained.

Figure 6:
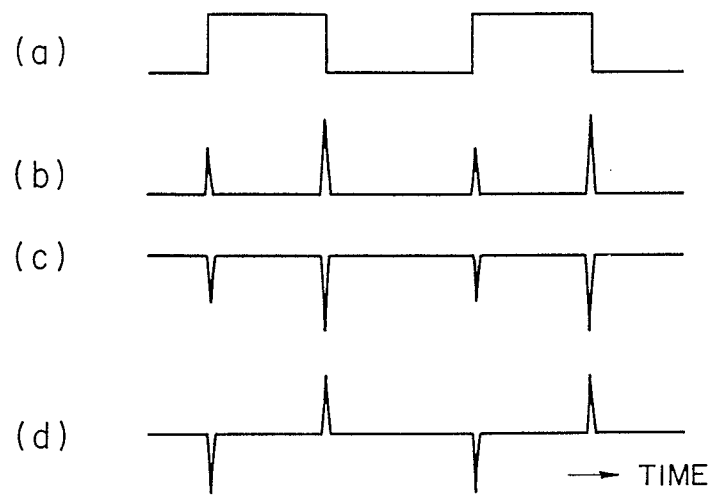
FIGS. 6a, 6b; 6c, 7a, and 7b show waveforms indicating the relation between the light pulse for recording and reproduced signals in Embodiment 1 of this invention.

Under the conditions that the recording film 3 of the information recording medium indicated in FIG. 3 is 350 nm thick, that this information recording medium is rotated with a speed of 1200 rpm, that after the recording film 3 has been initialized by irradiating the recording film 3 with a continuous semiconductor laser light beam of a power of 14.1 mW so that it is melted and the elements therein react on each other, it is irradiated with rectangular pulses of laser diode for recording, whose recording frequency is 0.12 MHz, and that reading light having a wavelength of 830 nm is used and its reflected light is detected, a reproduced signal as indicated in FIG. 6(c) is obtained. Then, when it is irradiated with a continuous light beam of a power of 14.1 mW, the reproduced signal of 0.12 MHz is reduced. Therefore it is possible to repeat recording and erasing. The reproduced signal can be treated as it is without passing through any differential circuit. In addition jitter of the recorded signal with respect to the recording light pulse is very small and it is under 30 nm. Further the error rate of this signal is $1 \times 10^{-6}$. Still further, since variations in the mean reflectivity are small, it is recognized that a merit can be obtained that influences of the recording on the servo system for tracking or autofocus are small. Furthermore repetition of recording and erasing more than $1 \times 10^5$ times is possible with this information recording medium. After a repetition of recording and erasing of $1 \times 10^6$ times the error rate is increased to $2 \times 10^{-6}$, which gives rise to no problem in practice.

In the case where the recording film 3 is 350 nm thick, the recording is possible for the recording laser power comprised between 9 and 22 mW. Further, for a region of the number of rotation of the information recording medium between 600 and 1500 rpm it is possible to obtain a reproduced signal having a shape similar to that obtained in this embodiment and the recording frequency permitting to obtain the reproduced signal of this embodiment is below 1 MHz at a number of rotation of 1200 rpm. In addition, in the case where the recording frequency of the rectangular light pulse for recording is 0.9 MHz, a good reproduced signal can be obtained, when the duty cycle of the rectangular light pulse is 30 to 70%. That is, if the duty cycle is under 30%, it is difficult to separate the rising and falling edges of the rectangular light pulse, and if it is over 70%, the cooling speed decreases and the amplitude of the reproduced signal is reduced.

Under the conditions that the recording film 3 of the information recording medium indicated in FIG. 3 is 250 nm thick, that this information recording medium is rotated with a speed of 2400 rpm, the other parameters being kept to be same as those used in the preceding Embodiment, that after the recording film 3 has been initialized by irradiating the recording film 3 with a continuous light beam of laser diode of a power of 14.1 mW, it is irradiated with rectangular light pulses of laser diode for recording, whose power is 14.1 mW and whose recording frequency is 1.77 MHz and that reading light having a wavelength of 830 nm is used and its reflected light is detected, a reproduced signal as indicated in FIG. 6(d) is obtained. The reproduced signal coming from the part corresponding to the rising edge of the light pulse appears in the negative direction and the reproduced signal coming from the part corresponding to the falling edge of the light appears in the positive direction. Then, when the information recording medium is irradiated with a continuous light beam of a power of 14.1 mW, the intensity of the reproduced signal is reduced.

Figure 7:
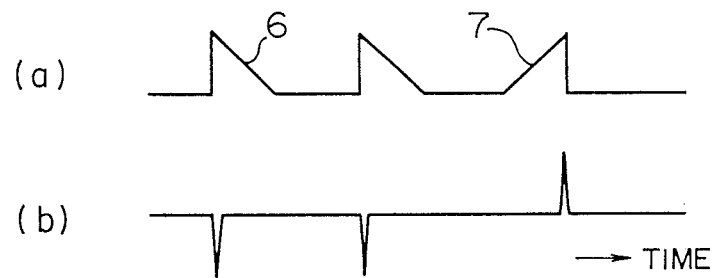

Under the conditions that the recording film 3 of the information recording medium indicated in FIG. 3 is about 250 nm thick, that this information recording medium is rotated with a speed of 2400 rpm, the other parameters being kept to be same as those used in the preceding Embodiment, that after the recording film 3 has been initialized by irradiating the recording film 3 with a continuous light beam of a power of 14.1 mW, whose wavelength is 830 nm, it is irradiated with triangular light pulses for recording 6,7, as indicated in FIG. 7(a), whose power is 14.1 mW and whose recording frequency is 1.77 MHz, and that reading light having a wavelength of 830 nm is used and its reflected light is detected, reproduced signals can be obtained only at the rising edge of the triangular light pulse 6 and at the falling edge of the triangular light pulse 7. The reproduced signal coming from the recorded portion formed by the triangular light pulse 6 appears in the negative direction and the reproduced signal coming from the recorded portion formed by the triangular light pulse 7 appears in the positive direction. In this way three-valued recording is possible. Then, when the information recording medium is irradiated with a continuous light beam of a power of 14.1 mW, the reproduced signal disappears.

In the case where the recording film 3 is 250 nm thick, recording is possible for a region of the power of the light pulse for recording between 12 and 25 mW and reproduced signals indicated in FIG. 6(d) and FIG. 7(b) are obtained. Further, for a region of the number of rotation of the information recording medium between 1800 and 3000 rpm, reproduced signals indicated in FIG. 6(d) and FIG. 7(b) are obtained. Still further, for recording frequencies under 2 MHz reproduced signals indicated in FIG. 6(d) and FIG. 7(b) are obtained.

Although, in the above embodiments, explanation has been made for the case where laser light is used as the energy beam, another light beam or another energy beam, e.g. an electron beam, etc. may be used. Further, although a recording film 3 consisting of Ge-Te-Se, for which rewrite of information is effected by crystal-amorphous phase change, has been used in the above embodiments as the recording film 3, other recording films of the Ge-Te system (recording films including Ge and Te, and one or a plurality of other elements at need) may be used and it is desirable to use a substance, whose crystallization time is comprised between 5 and 50 ns. Still further it is desirable that the recording film 3 is 50–500 nm thick, more preferably 200–400 nm thick. In addition, although, in the above embodiments, the reflectivity of the information recording medium has been detected, it is also possible to detect light transmittance or polarization characteristics of the information recording medium. Further, although, in the above embodiments, explanation has been made for the case where information is recorded on one side of the information recording medium, it is also possible to record information on both sides of the information recording medium by sticking 2 sheets of the information recording medium indicated in FIG. 3 together using organic adhesive.

As a modification of the case where the recording film 3 is 350 nm thick in this embodiment, a light pulse as indicated in FIG. 8(a) is used as the laser light for recording. When the recording film 3 is irradiated with the laser light having a recording frequency of 1 MHz and a duty cycle of 50%, a reproduced signal as indicated in FIG. 8(b) is obtained. When it is irradiated with a continuous light beam of 14.1 mW as the laser light for erasing, the intensity of the reproduced signal is reduced, which permits repetitions of recording/erasing.

Embodiment 2

An information recording medium indicated in FIG. 3 is used, in which the protective layer 2 is 100 nm thick; the protective layer 4 is 200 nm thick and made of $ZrO_2$ formed by the sputtering method; and the recording film 3 is an In-Se-Tl film formed by the co-evaporation method, these being disposed on a glass disk, whose diameter is 13 cm. This disk is sticked with another glass disk on the side of the protective layer 4 by means of adhesion.

Figure 9:
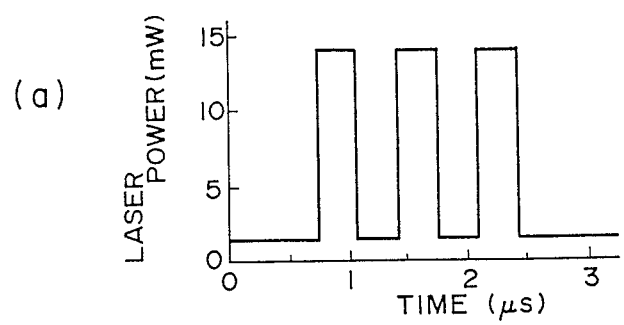
FIGS. 9a, 9b, 10a and 10b show waveforms indicating two different relations between the light pulse for recording and reproduced signals in Embodiment 2 of this invention.
Figure 9:
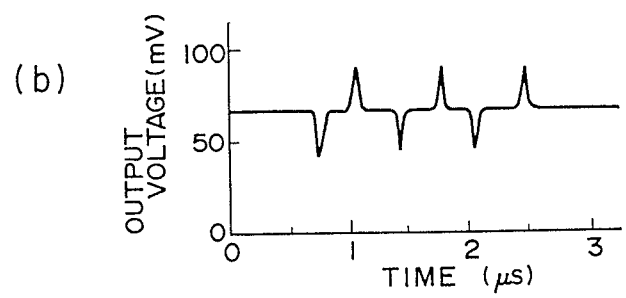

When the information recording medium, which is rotated with a speed of 1200 rpm, is irradiated with a laser-diode light of 14.1 mW, whose wavelength is 830 nm, the irradiated portion of the recording film 3 is melted so that the different elements in the recording film 3 can react sufficiently on each other. The reproduction light for obtaining reproduced signals is a continuous light of 1.5 mW. No variations are observed, when the recording film is irradiated with the reading light for more than 100 hours. The laser light for recording is produced by a same laser diode as for the reading light, which laser light for recording consists of rectangular light pulses rising from the reproduction power level as indicated in FIG. 9(a). Reading out the address of the track or the sector is verified with irradiation at the reproduction power level before the rising of the pulse. When the recording film 3 is irradiated with the laser light for recording, whose recording frequency is 1.5 MHz and whose duty cycle is 50%, a reproduced signal as indicated in FIG. 9(b) is obtained in the same way as in Embodiment 1. Then, when it is irradiated with a continuous laser light of 14.1 mW for erasing, the intensity of the reproduced signal is reduced, which permits repetitions of recording/erasing.

Although a recording film 3 consisting of In-Se-Tl has been used in the above embodiment, other recording films of the In-Se system (recording films including In and Se, and one or a plurality of other elements at need) may be used.

Figure 10:
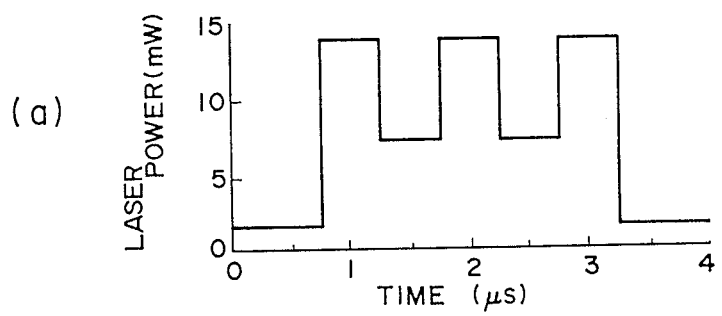
Figure 10:
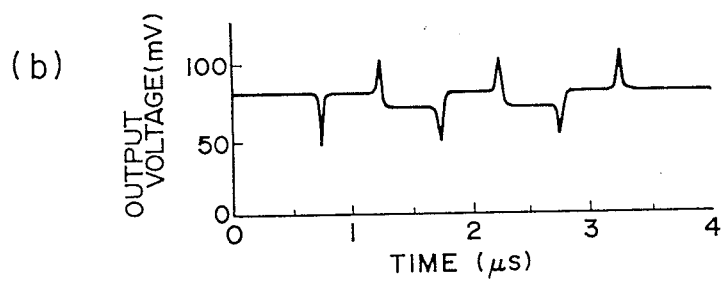

Further, in a modification of this embodiment a light pulse as indicated in FIG. 10(a) is used as the laser light for recording. When the recording film 3 is irradiated with a recording light, whose recording frequency is 1 MHz and whose duty cycle is 50%, a reproduced signal as indicated in FIG. 10(b) is obtained. When this is irradiated with a continuous laser light of 14.1 mW for erasing, the intensity of the reproduced signal is reduced, which permits to repeat recording/erasing.

Finally, as the recording film 3 other than the recording film made of the group of materials mainly containing Ge-Te system or In-Se system, recording films of e.g. Ga-Se system, Sb-Se system, Sb-Te system, In-Te system, In-Sb system, Au-Te system, and Ga-Sb system may be used as well.

We claim:

1. An information recording apparatus comprising: information recording medium; and
means for at least one of recording and reproducing information by irradiating said information recording medium with an energy beam pulse, whereby a condition represented by $$\alpha < \tau < \beta, \alpha = A\frac{arl}{v}, \beta = B\frac{arl}{v}$$

is satisfied so that an amplitude of the reproduced signal obtained from an area on said medium, where the energy supplied from said energy beam pulse changes rapidly, changes to one direction immediately after changing to an opposite direction, where $\tau$: time necessary for the phase change in the recording medium, $\alpha$: time during which the temperature of a portion of the recording medium where the falling part of the energy beam pulse is irradiated passes through a phase-change temperature area, $\beta$: time during which the temperature of a portion of the recording medium where the continuous part of the energy beam pulse is irradiated passes through the phase-change temperature area, a: amount of thermal diffusion of the recording medium including a recording film and a protective layer, A: constant, B: constant, A<B, r: radius of the projected energy beam, v: linear velocity of the recording medium, l: pulse width of the beam pulse, and $a \propto$ (thermal conductivity) (specific heat)$^{-1}$ (density)$^{-1}$ (film thickness).

2. An information recording apparatus according to claim 1, wherein said recording film is said information recording medium is made of one selected from the group of materials including Ge-Te system, In-Se system, Ga-Se system, Sb-Se system, Sb-Te system, In-Te system, In-Sb system, Au-Te system and Ga-Sb system.

3. An information recording apparatus according to claim 1, wherein $\tau$ has a value in the range of about 10 ns to 100 ns.

4. An information recording apparatus according to claim 3, wherein $\alpha$ has a value in the range of about 4 ns to 50 ns.

5. An information recording apparatus according to claim 4, wherein v has a value in the range of about 8 m/s to 12 m/s.

6. An information recording apparatus according to claim 5, wherein a has a value in the range of about 0.15 $(\mu m)^3/\mu s$ to 1.0 $(\mu m)^3/\mu s$.

7. An information recording apparatus according to claim 6, wherein r has a value of about 0.8 $\mu m$.

* * * * *